(12) United States Patent
Burnham

(10) Patent No.: US 8,105,413 B2
(45) Date of Patent: Jan. 31, 2012

(54) MANUFACTURING OF BIOORGANIC-AUGMENTED HIGH NITROGEN-CONTAINING INORGANIC FERTILIZER

(75) Inventor: Jeffrey C. Burnham, Aiken, SC (US)

(73) Assignee: Vitag Corporation, Beech Island, SC (US)

( * ) Notice: Subject to any disclaimer, the term of this patent is extended or adjusted under 35 U.S.C. 154(b) by 672 days.

(21) Appl. No.: 11/359,751

(22) Filed: Feb. 23, 2006

(65) Prior Publication Data

US 2006/0243009 A1   Nov. 2, 2006

Related U.S. Application Data

(60) Provisional application No. 60/654,957, filed on Feb. 23, 2005, provisional application No. 60/759,050, filed on Jan. 17, 2006.

(51) Int. Cl.
*C05D 9/02* (2006.01)
*C05F 11/00* (2006.01)
*C05F 3/00* (2006.01)
*A01N 25/00* (2006.01)
*C02F 3/00* (2006.01)

(52) U.S. Cl. .............. 71/12; 71/11; 71/64.03; 71/64.01; 210/609

(58) Field of Classification Search ............. 71/9–63; 210/509, 613, 631, 667, 725, 752, 764; 502/102
See application file for complete search history.

(56) References Cited

U.S. PATENT DOCUMENTS

| | | | |
|---|---|---|---|
| 2,026,969 A | 1/1936 | Flynn | |
| 2,568,901 A | 9/1951 | Stengel | |
| 2,755,176 A | 7/1956 | Pearce et al. | |
| 2,800,457 A | 7/1957 | Green et al. | |
| 2,800,458 A | 7/1957 | Green | |
| 2,902,342 A | 9/1959 | Rehfeld | |
| 3,050,383 A | 8/1962 | Paden et al. | |
| 3,259,482 A | 7/1966 | Hansen | |
| 3,264,088 A | 8/1966 | Hansen | |
| 3,264,089 A | 8/1966 | Hansen | |

(Continued)

FOREIGN PATENT DOCUMENTS

DE        2523628        12/1976

(Continued)

OTHER PUBLICATIONS

U.S. Appl. No. 08/520,959, Burnham; Jeffrey C.

(Continued)

*Primary Examiner* — Jerry Lorengo
*Assistant Examiner* — Jennifer Smith
(74) *Attorney, Agent, or Firm* — Remenick PLLC

(57) ABSTRACT

The invention describes a new method for the production of high nitrogen organically-augmented inorganic fertilizer that incorporates municipal biosolids or organic sludges that can compete with traditional fertilizers such as ammonium phosphate, ammonium sulfate and urea on the commodity fertilizer marketplace. The method creates a thixotropic paste-like material from the biosolids or organic sludge that is blended with hot or molten ammonium salts, especially a mixture of ammonium phosphate and ammonium sulfate. The invention can be an add-on to commercial production of ammonium salts or it can stand alone by manufacturing ammonium salts prior to their introduction to the conditioned biosolids. The invention is oriented to be tailored to production facilities for individual municipal waste treatment plants in order to keep manufacturing plants small with a minimization of logistics and liability.

50 Claims, 5 Drawing Sheets

U.S. PATENT DOCUMENTS

| | | |
|---|---|---|
| 3,345,288 A | 10/1967 | Sontheimer |
| 3,475,154 A | 10/1969 | Kato |
| 3,476,683 A | 11/1969 | Liljeren |
| 3,655,395 A | 4/1972 | Karnemaat |
| 3,756,784 A | 9/1973 | Pittwood |
| 3,796,669 A | 3/1974 | Kiritani et al. |
| 3,837,872 A | 9/1974 | Conner |
| 3,915,853 A | 10/1975 | Luck |
| 3,939,280 A | 2/1976 | Karnemaat |
| 3,942,970 A | 3/1976 | O'Donnell |
| 3,960,718 A | 6/1976 | Lebo |
| 3,966,450 A | 6/1976 | O'Neill et al. |
| 4,001,140 A | 1/1977 | Foris et al. |
| 4,076,515 A * | 2/1978 | Rickard ............................ 71/10 |
| 4,079,003 A | 3/1978 | Manchak |
| 4,100,103 A | 7/1978 | Foris et al. |
| 4,108,771 A | 8/1978 | Weiss |
| 4,124,405 A | 11/1978 | Quienot |
| 4,134,750 A | 1/1979 | Norton et al. |
| 4,154,593 A | 5/1979 | Brown et al. |
| 4,180,459 A | 12/1979 | Zievers |
| 4,219,347 A | 8/1980 | Young |
| 4,230,568 A | 10/1980 | Chappell |
| 4,249,929 A | 2/1981 | Kneer |
| 4,270,279 A | 6/1981 | Roediger |
| 4,304,588 A | 12/1981 | Moore, Jr. |
| 4,306,978 A | 12/1981 | Wurtz |
| 4,377,406 A | 3/1983 | Achorn et al. |
| 4,377,486 A | 3/1983 | Barrick et al. |
| 4,405,354 A | 9/1983 | Thomas, II et al. |
| 4,500,428 A | 2/1985 | Lynch et al. |
| 4,514,307 A | 4/1985 | Chestnut et al. |
| 4,519,831 A | 5/1985 | Moore, Jr. |
| 4,541,986 A | 9/1985 | Schwab et al. |
| 4,554,002 A | 11/1985 | Nicholson |
| 4,601,863 A | 7/1986 | Shioi et al. |
| 4,619,684 A | 10/1986 | Salladay et al. |
| 4,655,932 A | 4/1987 | Roslonski |
| 4,659,472 A | 4/1987 | Nordlund et al. |
| 4,711,659 A | 12/1987 | Moore |
| 4,743,287 A | 5/1988 | Robinson |
| 4,772,490 A | 9/1988 | Kogler et al. |
| 4,781,842 A | 11/1988 | Nicholson |
| 4,792,349 A | 12/1988 | Trimm et al. |
| 4,793,927 A | 12/1988 | Meehan et al. |
| 4,902,431 A | 2/1990 | Nicholson et al. |
| 4,966,706 A | 10/1990 | Gregor |
| 4,997,572 A | 3/1991 | Wurtz |
| 5,013,458 A | 5/1991 | Christy, Sr. et al. |
| 5,051,031 A | 9/1991 | Schumacher et al. |
| 5,087,375 A | 2/1992 | Weinwurm |
| 5,118,337 A | 6/1992 | Bleeker |
| 5,125,951 A | 6/1992 | Lahoda et al. |
| 5,135,664 A | 8/1992 | Burnham |
| 5,147,563 A | 9/1992 | Long, Jr. et al. |
| 5,183,577 A * | 2/1993 | Lehmann ...................... 210/761 |
| 5,238,480 A | 8/1993 | Rehberg et al. |
| 5,252,116 A | 10/1993 | Markham et al. |
| 5,259,977 A | 11/1993 | Girovich et al. |
| 5,275,733 A | 1/1994 | Burnham |
| 5,340,376 A | 8/1994 | Cunningham |
| 5,342,442 A | 8/1994 | Nechvatal et al. |
| 5,346,527 A | 9/1994 | Rehbein et al. |
| 5,356,540 A | 10/1994 | Khan et al. |
| 5,385,673 A | 1/1995 | Fergen |
| 5,393,317 A | 2/1995 | Robinson |
| 5,401,402 A | 3/1995 | Christy et al. |
| 5,409,605 A | 4/1995 | Haley et al. |
| 5,417,861 A | 5/1995 | Burnham |
| 5,419,839 A | 5/1995 | Haley et al. |
| 5,422,015 A | 6/1995 | Angell et al. |
| 5,435,923 A | 7/1995 | Girovich |
| 5,443,613 A | 8/1995 | Robinson |
| 5,466,273 A | 11/1995 | Connell |
| 5,500,044 A | 3/1996 | Meade et al. |
| 5,554,279 A | 9/1996 | Christy |
| 5,556,445 A | 9/1996 | Quinn et al. |
| 5,580,458 A | 12/1996 | Yamasaki et al. |
| 5,593,590 A | 1/1997 | Steyskal |
| 5,593,591 A | 1/1997 | Ohsol et al. |
| 5,603,842 A | 2/1997 | Whitaker et al. |
| 5,618,442 A | 4/1997 | Christy |
| 5,635,069 A | 6/1997 | Boss et al. |
| 5,669,969 A | 9/1997 | Meade et al. |
| 5,679,129 A | 10/1997 | Hon |
| 5,681,481 A | 10/1997 | Christy et al. |
| 5,733,355 A | 3/1998 | Hibino et al. |
| 5,766,302 A | 6/1998 | Lefroy et al. |
| 5,783,073 A | 7/1998 | Christy et al. |
| 5,807,724 A | 9/1998 | Resnick |
| 5,849,060 A | 12/1998 | Diping et al. |
| 5,853,450 A | 12/1998 | Burnham et al. |
| 5,853,590 A | 12/1998 | Burnham |
| 5,862,610 A | 1/1999 | Lipert |
| 5,876,613 A | 3/1999 | Bonnin et al. |
| 5,906,750 A | 5/1999 | Haase |
| 5,916,448 A * | 6/1999 | Fergen .......................... 210/723 |
| 5,984,992 A | 11/1999 | Greer et al. |
| 5,993,505 A | 11/1999 | Tijsma et al. |
| 6,051,411 A | 4/2000 | Turtakovsky et al. |
| 6,103,191 A | 8/2000 | Luker |
| 6,117,406 A | 9/2000 | Vogel et al. |
| 6,159,263 A | 12/2000 | Greer et al. |
| 6,165,550 A | 12/2000 | Markusch et al. |
| 6,176,891 B1 | 1/2001 | Komoriya et al. |
| 6,187,074 B1 | 2/2001 | von Locquenghien et al. |
| 6,237,246 B1 | 5/2001 | Millard |
| 6,237,264 B1 | 5/2001 | Gulick, Jr. |
| 6,256,902 B1 | 7/2001 | Flaherty et al. |
| 6,284,278 B1 | 9/2001 | Waldman et al. |
| 6,325,035 B1 | 12/2001 | Codina et al. |
| 6,331,300 B1 | 12/2001 | Dybas et al. |
| 6,398,840 B1 | 6/2002 | Orta-Castro |
| 6,406,510 B1 * | 6/2002 | Burnham .......................... 71/11 |
| 6,409,788 B1 | 6/2002 | Sower |
| 6,409,789 B1 | 6/2002 | Gilbert |
| 6,461,399 B1 | 10/2002 | Connell |
| 6,465,706 B1 | 10/2002 | Rogers et al. |
| 6,517,599 B2 | 2/2003 | Gilbert |
| 6,623,650 B2 | 9/2003 | Millard |
| RE38,283 E | 10/2003 | Yamamatsu |
| 6,666,154 B2 | 12/2003 | Logan et al. |
| 6,716,360 B2 | 4/2004 | Titmas |
| 6,752,848 B2 | 6/2004 | Logan |
| 6,752,849 B2 | 6/2004 | Logan et al. |
| 6,758,879 B2 | 7/2004 | Greer et al. |
| 6,841,515 B2 | 1/2005 | Burnham |
| 6,852,142 B2 | 2/2005 | Varshovi |
| 7,128,880 B2 | 10/2006 | Dahms et al. |
| 7,604,742 B2 | 10/2009 | Shankar et al. |
| 7,789,931 B2 | 9/2010 | Burnham et al. |
| 2003/0089151 A1 | 5/2003 | Logan et al. |
| 2003/0121302 A1 | 7/2003 | Oliver et al. |
| 2004/0065127 A1 | 4/2004 | Connell |
| 2004/0120867 A1 | 6/2004 | Dahms et al. |
| 2004/0177664 A1 | 9/2004 | Hale |
| 2005/0005660 A1 | 1/2005 | Burnham et al. |
| 2005/0019207 A1 | 1/2005 | Oliver et al. |
| 2005/0039508 A1 | 2/2005 | Burnham |
| 2006/0243009 A1 | 11/2006 | Burnham |
| 2006/0254331 A1 | 11/2006 | Burnham |
| 2007/0062233 A1 | 3/2007 | Burnham |
| 2007/0257715 A1 | 11/2007 | Semerdzhiev |
| 2008/0000279 A1 | 1/2008 | Faulmann et al. |
| 2008/0230484 A1 | 9/2008 | Burnham et al. |
| 2010/0139345 A1 | 6/2010 | Burnham |
| 2010/0139346 A1 | 6/2010 | Burnham |

FOREIGN PATENT DOCUMENTS

| | | |
|---|---|---|
| DE | 2800915 | 9/1978 |
| DE | 4127459 | 2/1993 |
| EP | 0143392 | 6/1985 |
| EP | 0557078 | 8/1993 |
| EP | 0770586 | 5/1997 |
| FR | 2133115 | 11/1972 |
| FR | 2757504 | 6/1998 |
| JP | 58032638 | 2/1983 |

| | | |
|---|---|---|
| JP | 9110570 | 4/1997 |
| JP | 2001129597 | 5/2001 |
| JP | 2002248454 | 9/2002 |
| WO | WO9856735 | 12/1998 |
| WO | WO9947282 | 9/1999 |
| WO | WO 0136082 | 5/2001 |
| WO | WO 0136887 | 5/2001 |
| WO | WO 0168562 | 9/2001 |
| WO | WO0169150 | 9/2001 |

OTHER PUBLICATIONS

U.S. Appl. No. 08/532,273, Burnham; Jeffrey C.

* cited by examiner

MANUFACTURING OF BIOORGANIC-AUGMENTED HIGH NITROGEN-CONTAINING INORGANIC FERTILIZER

REFERENCE TO RELATED APPLICATIONS

This application claims priority to U.S. Provisional Applications Nos. 60/654,957 and 60/759,050, both entitled "Manufacturing of Bioorganic-Augmented High Nitrogen-Containing Inorganic Fertilizer" and filed Feb. 23, 2005 and Jan. 17, 2006, which are both specifically and entirely incorporated by reference.

BACKGROUND OF THE INVENTION

1. Field of the Invention

This invention is directed to systems, devices and methods for cone ammonium salts, especially ammonium phosphate and ammonium sulfate and mixtures thereof, into bioorganic-augmented high nitrogen-containing inorganic fertilizer. The invention is also directed to products produced by processes of the invention.

2. Description of the Background

The disposal of sludges discharged from large-scale wastewater treatment plants is a serious and growing problem. In 1990, the United States Environmental Protection Agency indicated that a family of four discharged 300 to 400 gallons of wastewater per day. From this wastewater, publicly owned treatment works generated approximately 7.7 million dry metric tons of sludge annually or about 64 dry pounds of sludge for every individual in the United States. By the year 2000, these figures had doubled.

The definitions of "sewage sludge and sludge" under by Title 40 of the Code of Federal Regulations Part 257.2, hereby incorporated by reference, is as follows:

"Sewage sludge means solid, semi-solid, or liquid residue generated during the treatment of domestic sewage in a treatment works. Sewage sludge includes, but is not limited to, domestic septage; scum or solid removed in primary, secondary or advanced wastewater treatment processes; and a material derived from sewage sludge. Sewage sludge does not include ash generated during the firing of sewage sludge in a sewage sludge incinerator or grit and screenings generated during preliminary treatment of domestic sewage in a treatment works. Sludge means solid, semi-solid or liquid waste generated from municipal, commercial, or industrial wastewater treatment plant, water supply treatment plant, or air pollution control facility or any other such waste having similar characteristics and effect."

There are several types of sludges that cam be produced by sewage and/or wastewater treatment. These include primary sludge, waste activated sludge, pasteurized sludge, heat-treated sludge, and aerobically or anaerobically digested sludge, and combinations of all. These sludges may be from municipal and/or industrial sources.

Most commonly, sludges are dewatered to the best extent possible by chemical and mechanical means. The water content of sewage sludges is still very high. Typical sludges coming out of a gravity clarifier may have a dry solids content of 2% or less. After anaerobic digestion, the solids content can be about 10%. Cationic water-soluble polymers have been found useful for causing further separation between the solids and the water that is chemically and physically bound. Filtration or centrifugation of cationic polymer treated sludge typically yields a paste-like sludge cake containing about 20% solids.

Drying of sewage sludge has been practiced for many years in both the United States and Europe. Sludge drying in the United States prior to about 1965 was undertaken to reduce transportation costs and in pursuit of various disposal options. In some plants, the sludge was dried in powder form and the fine particles were consumed in the combustion chamber of an incinerator or boiler. In the late 1960's two municipalities, Houston and Milwaukee, began to market a pelletized or granulated dried sludge for use as a soil amendment and/or fertilizer. Several more plants for manufacture of dried pelletized sludge were built in the 1980's and 1990's; especially after ocean dumping of sludge by coastal cities was eliminated. Drying and conversion to a pelletized fertilizer was the best option for these metropolitan areas where landfills and land for disposal were limited. However, the investment required for a sludge drying facility is large. A typical twit costs about $150 million for equipment alone.

The most common type of sludge dried and pelletized is anaerobically digested municipal sewage. Anaerobic digestions, as the name suggests, involves treatment by facultative bacteria under anaerobic conditions to decompose the organic matter in the sludge. After a prescribed time and temperature, a sludge relatively free of putrifiable organic matter and pathogens is obtained. Municipal anaerobically digested sewage sludge is therefore preferred for agricultural purposes.

However, dry sewage sludge has several disadvantages for agricultural use. It has low fertilization value, typically having nitrogen content of only about 2-5%. Freight and application costs per unit of nitrogen are high. It often has a disagreeable odor, particularly when moist. It has low density and when blended with other commercial fertilizer materials, it may segregate into piles or may not spread on the field uniformly with other more dense ingredients. Bacterial action may continue and under storage conditions sludge temperature may rise to the point of autoignition. Hence, except for special markets that value its organic content for soil amendment or filler in blended fertilizer, there is little demand for the product. In most cases municipalities must pay freight charges, or may offer other incentives for commercial growers to use the material. However, this is frequently still more economical than alternative disposal schemes.

The market value for fertilizers is principally based on their nitrogen content. A need exists for a practical and economic method for increasing the nitrogen content of sewage sludge to a level approaching that of commercial mineral fertilizers, i.e., 10-20%. Freight costs and the cost of application per unit of nitrogen would then be much lower. Overall value and demand would increase. Moreover, sludge has an advantage in that its nitrogen is of the slow release type. The nitrogen is part of organic molecules and hence is available to growing plants only when the molecule is broken down. This is very desirable since it provides nitrogen to the plant all through its growing cycle. Manufactured slow release nitrogen fertilizers have a price nearly 10 times that of ordinary mineral nitrogen fertilizers. Conceivably, municipalities would enjoy a credit rather than an expense in disposing of their dried sludge product if the total nitrogen content can be increased and the tendency for autoignition reduced or eliminated Prior attempts have been made to reach some of these objectives. U.S. Pat. Nos. 3,942,970, 3,655,395, 3,939,280, 4,304,588, and 4,519,831 describe processes for converting sewage sludge to fertilizer. In each of these processes a urea-formaldehyde condensation product is formed in situ with the sludge. However, the processes require the handling of formaldehyde, a highly toxic lachrymator and cancer suspect agent.

French Patent No. 2,757,504 describes the blending of mineral fertilizers with organic sludge. The mixture is heated to a temperature between 200° C. and 380° C. Japanese Patent No. 58032638 describes a process where sludge is treated with sulfuric and nitric acids or sulfuric and phosphoric acids and ammonia under elevated pressure of about 3 atmospheres. These prior art processes require costly process equipment and/or special conditions not readily incorporated in existing sewage treatment facilities.

The simplest method of increasing the nitrogen in sludge would be to add commercial nitrogen fertilizer materials to the wet sludge prior to drying and pelletizing. There are only a few high-nitrogen fertilizer materials that are economic for use in agriculture: ammonia (82 wt. % N), urea (37 wt. % N), and ammonium nitrate (35 wt. % N). Ammonia has high volatility and is subject to strict regulation of discharges to the atmosphere. Urea is a solid that adsorbs moisture quite readily and makes the sludge more difficult to dry. It is also highly susceptible to breakdown to ammonia by the microbes and enzymes in sludge, resulting in nitrogen loss and an odor problem. Ammonium nitrate is a strong oxidizer and creates a potential explosion problem. All of these fertilizers have high nitrogen content: but are unsuitable for combining with sludge.

Another possible candidate that has been unsuccessfully tested by the industry as an additive to sludge is ammonium sulfate. Although ammonium sulfate has lower nitrogen content (21 wt % N) than the materials discussed above, it has a price per unit of nitrogen comparable to that of the other commercial fertilizers. It is also relatively inert to the microbes and enzymes in sludge.

It has been found in full-scale plant trials that a problem occurs during the dry of a mixture of ammonium sulfate and sludge. Title 40 of the Code of Federal Regulations, Part 503, Appendix B specifies that the tempers of the sewage sludge particles must exceed 80° C. (176° F.) or the wet bulb temperature of the gas in contact with the sewage sludge must leave the dryer at a temperature exceeding 80° C. (176° F.). However, when drying a mixture of ammonium sulfate and sludge, a sudden release of ammonia vapors occurs at about 60° C. (140° F.) overwhelming the air pollution control system. Several attempts at addition of ammonium sulfate to sewage sludge in several different plants over several years have foundered on this problem. The discharge of ammonia to the atmosphere is environmentally intolerable. Consequently, ammonium sulfate addition to sewage sludge has not been successful to date.

European Patent No. 0143392 B1 describes a process in which an undigested liquid sludge is mixed with salts such as ammonium sulfate at a concentration of 17-47 wt. % at a pH of 2-6 for a period of 3 to 12 hours followed by disposal. Japanese Patent No. 9110570 A2 describes the treatment of sewage sludge with an acidic solution followed by dig to reduce ammonia evolution and to retain the effective nitrogen. Therein is described the use of dilute (0.3 Normal) aqueous solutions of HCl, $H_2SO_4$, and wood vinegar as ammonia binders ("Granulation of Compost From Sewage Sludge. V. Reduction of Ammonia Emission From Drying Promess", Hokiadoritsu Kogyo Shikenjo Hokoku, 287, 85-89 (1988)). None of these references disclose the use of acids with ammonium sulfate additions and neither reference discusses the issue of corrosion of steel process equipment under acid conditions.

Over the past thirty year alkaline stabilization of sludges has been a standard and successful method of making sludges into beneficially useful materials that cal be used principally as soil-conditioning materials. Because these sludges have high calcium carbonate equivalencies, they have been produced and marketed as AG-lime materials, usually as a replacement for calcium carbonate in farm soil management strategies. Because of this usage the value of these materials has been restricted to only a few dollars per ton of product, they are economically and geographically restricted because of transportation costs to areas close to the source of their treatment. Many of these alkaline-stabilized sludges contain up to 65% water.

Thus, there is a long standing need for practical means of increasing the economic value of sewage sludge through increasing its nitrogen content, and increasing its ability to be spread as well as a need to treat these materials such that they are converted into commodity fertilizers with physical and chemical and nutrient properties such that they can command significant value in the national and international commodity fertile marketplace. The present invention meets those needs.

SUMMARY OF THE INVENTION

The invention overcomes the problems and disadvantages associated with current systems and methods of manufacturing fertilizers from sludge and related waste materials, and also the fertilizes prepared by these methods.

One embodiment of the invention is directed to methods of manufacturing a fertilizer comprising dewatering and conditioning an amount of bioorganic sludge from an amount of municipal dewatered biosolids in a plant; obtaining an amount of ammonium salts; mixing and heating the ammonium salts to create a molten ammonium salt; and augmenting the ammonium salts with the bioorganic sludge to create a bio-augmented inorganic fertilizer in the plant wherein ammonium salts are obtained from an adjacent wastewater treatment plant facility.

Another embodiment of the invention is directed to methods of manufacturing a fertilizer comprising mixing an organic sludge to produce a thixotropic paste; acidifying the thixotropic paste in a chamber with acid to produce a first mixture, obtaining a high temperature inorganic fertilizer melt comprised of ammonium salts; blending the melt with the first mixture to produce a second mixture with a temperature over 85° C. (185° F.); blending at least one conditioner and at least one hardener into the second mixture to control hardness and pH; removing water from the second mixture to produce a material that can be further processed; and creating an end product from the second mixture.

Another embodiment of the invention is directed to methods of manufacturing fertilizer comprising mixing an organic sludge to produce a thixotropic paste; acidifying the thixotropic paste in a chamber with acid to produce a first mixture; obtaining a high temper inorganic fertilizer melt comprised of ammonium salts; and mixing the melt with the organic sludge in three heated pressure vessels to create an end product from the mixture.

Another embodiment of the invention is directed to fertilizers manufactured using the methods of the invention. Fertilizes of the invention are inorganic, with a high nitrogen content, and can be augmented with bioorganic materials.

Other embodiments and advantages of the invention are set forth in part in the description, which follows, and in part, may be obvious from this description, or may be learned from the practice of the invention.

DESCRIPTION OF THE INVENTION

The present invention is directed to methods of manufacturing a fertilizer, especially a bio-augmented inorganic fertilizer, as well as fertilizers manufactured by these methods. The present invention takes advantage of the property of dewatered biosolids or organic sludges to become thixotropic pastes when vigorously mixed, back-mixed and folded. This invention teaches that mechanical mixers, especially of the plow blender type, placed in series convert hot molten ammonium salts into bioorganic-augmented inorganic fertilizers without the need for traditional massive fertilizer manufacturing facilities that are commonly multiple stories tall or higher. The present invention creates a melt of ammonium salt, preferably a mixture of ammonium phosphate and ammonium sulfate independent of any biosolids. This separation of the manufacture of the ammonium salt provides a surprising advantage over at least U.S. Pat. Nos. 5,984,992, 6,159,263 and 6,758,879, and also U.S. patent application Ser. Nos. 10/322,802 and 10/854,677, in that the rate of manufacture of the ammonium salt can be independent of the rate of processing the biosolids. Any excess ammonium salt can be processed independently as a pure ammonium salt fertilizer.

Figure 1:
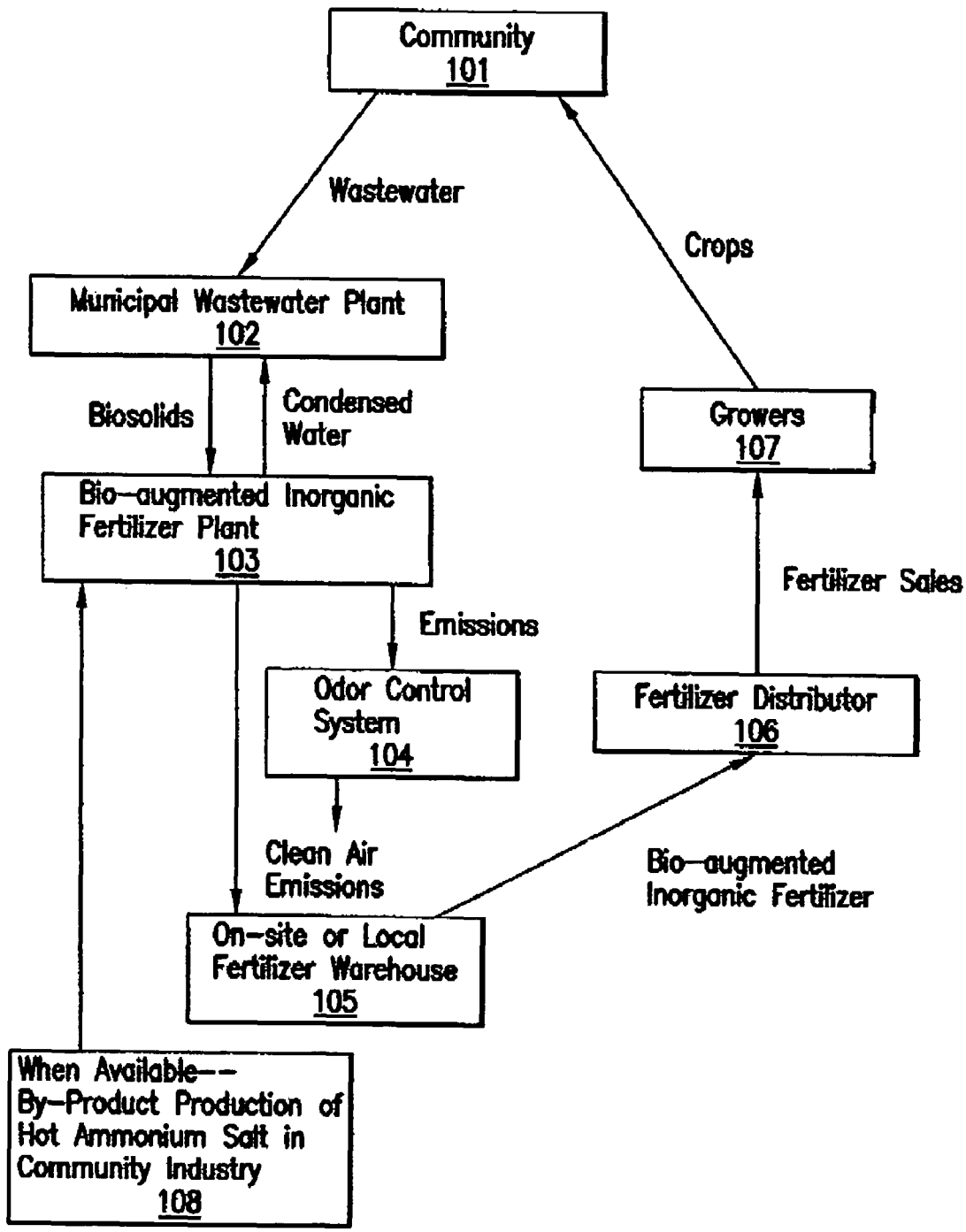
FIG. 1 Schematic overview of the benefit of the local fertilizer production process as it relates to a community FIG. 2 Schematic overview of the benefit of the fertilizer production using thixotropic paste.

Also, the present invention does not use biosolids as a cooling agent for the operation of the reactor in which the ammonium salt is manufactured. The present invention has the advantage over earlier teachings in that it is interfaced with ammonium salt fertilizer production that is associated with unrelated businesses of nylon or steel production. In these two industries, as shown in FIG. 1, ammonium sulfate is a by-product (108). This invention has the further advantage in that the manufacturing process is capable of being scaled to match the biosolids production of municipal wastewater treatment plants (102). Because of this, fertilizer production process of the present invention can be sited directly adjacent to municipal wastewater treatment plant facilities thereby eliminating the need for transport of the biosolids to distant fertilizer manufacturing facilities. An odor control system is also locally sited to facilitate meeting USEPA standards and making the process more efficient (104).

The present invention also reduces the logistics and liability previously associated with the production of granular fertilizers that contained biosolids. This location of a manufacturing facility adjacent or close to the wastewater treatment plant drastically reduces the cost of transporting the biosolids cake to the fertilizer manufacturing facility. Similarly, this proximity reduces the opportunities for accidents to occur during transportation thereby reducing the liability associated with such transportation.

As shown in FIG. 1, fertilizer manufacturing plant (105) is sized to service the needs of the community (101) in which it is sited. This results in a smaller biosolids processing/fertilizer manufacturing plant being constructed which also reduces costs and because it is smaller, reduces logistics of operation and liability. Such community-oriented facilities optimally serve the needs of the fertilizer distributors and their grower customers by reducing the traditional distances needed to transport the finished fertilizer product. These locally sited storage facilities thereby can serve as community or regional fertilizer warehouse facilities (105). Having a local site also further reduces logistics associated with the fertilizer industry in that the finished product of the invention, a high nitrogen fertilizer, can be shipped shorter distances to fertilizer distributors (106), end users or the growers (107), thereby reducing transportation costs for the product as well as the input biosolids or organic sludge.

The present invention is unique compared to traditional fertilizer manufacturing practices in which a large manufacturing facility is sited away from communities as much as possible and the input materials must be shipped from long distance to operate the plant. A good example of this was the plant in Helena, Ark. which practices the manufacturing processes taught in U.S. Pat. Nos. 5,984,992; 6,159,263; and 6,758,879. For this fertilizer manufacturing plant the biosolids were shipped all the way from New York City at a significant cost to the manufacturing process. The present invention eliminates this due to local location.

The unique concept of this fertilizer process is to augment ammonium phosphate and ammonium sulfate salts with dewatered and conditioned bioorganic sludges selected from the group comprised of municipal dewatered biosolids (102), pharmaceutical fermentation wastes and microbial digests of other organic products such as food stuffs and or animal manures or digested animal manures in a series of heated mixing chambers, e.g., single shaft or double shaft pug mill type blenders, preferably a blending apparatus utilizing a plow-shaped blade configuration. The product of this invention is a USEPA Class A fertilizer product of suitable dryness, hardness and chemical quality to produce a valuable high-nitrogen (N) commercial fertilizer product that is capable of competing in the national and international marketplace against traditional inorganic fertilizers. The Class A characteristic refers to the microbiological quality of the finished fertilizer product in that it meets the United States Environmental Protection Agency Class A microbiological standards for a product containing municipal biosolids as defined in 40 CFR Part 503. Specifically, the present invention meets this standard on the basis of the time-temperature conditions that are established by the invention and the fact that the associated USEPA Vector Attraction Standards are met by the fact that the finished fertilizer of the present invention is greater than 90% dry solids in composition.

It has been surprisingly discovered in the present invention that manufacturing with the claimed process produces a cleaner, more sterile fertilizer. The process as described in FIG. 2, creates an autoclave effect that hydrolyzes more proteins. The high pressures and stress conditions make the fertilizer cleaner and less harmful. Safety concerns involving biosolid sludge is increasing daily due to organic farming and an increasing amount of biosolid waste. The present invention produces fertilizer with amounts of arsenic, cadmium, copper, lead, mercury, molybdenum, nickel, selenium and/or zinc well below levels of harm. With undetectable traces of sum materials, the resulting fertilizer is safe for use in and around farming, plants, and animals. Further, it is safe for handling by and around humans.

The present invention is the first to separate the manufacture of the ammonium salt from the production of a biosolids or organic sludge-containing fertilizer product. This is especially advantageous, not only because the rates of production may be independent of each other, but that the production of the ammonium salt involves either no input cooling agent or the input of water which is considerably easier to control than the input of biosolids as required by the previous art taught in U.S. Pat. Nos. 5,984,992; 6,159,263; and 6,758,879. It is further a new teaching of the present invention that the biosolids need not be slurried but that they can be directly blended with a molten ammonium salt following its production. This is possible because of the step of vigorous mixing of the biosolids or organic sludge in order to take advantage of the thixotropic properties of this material. Such mixing creates a paste-like material which can be blended well with said molten ammonium salt.

Figure 2A:
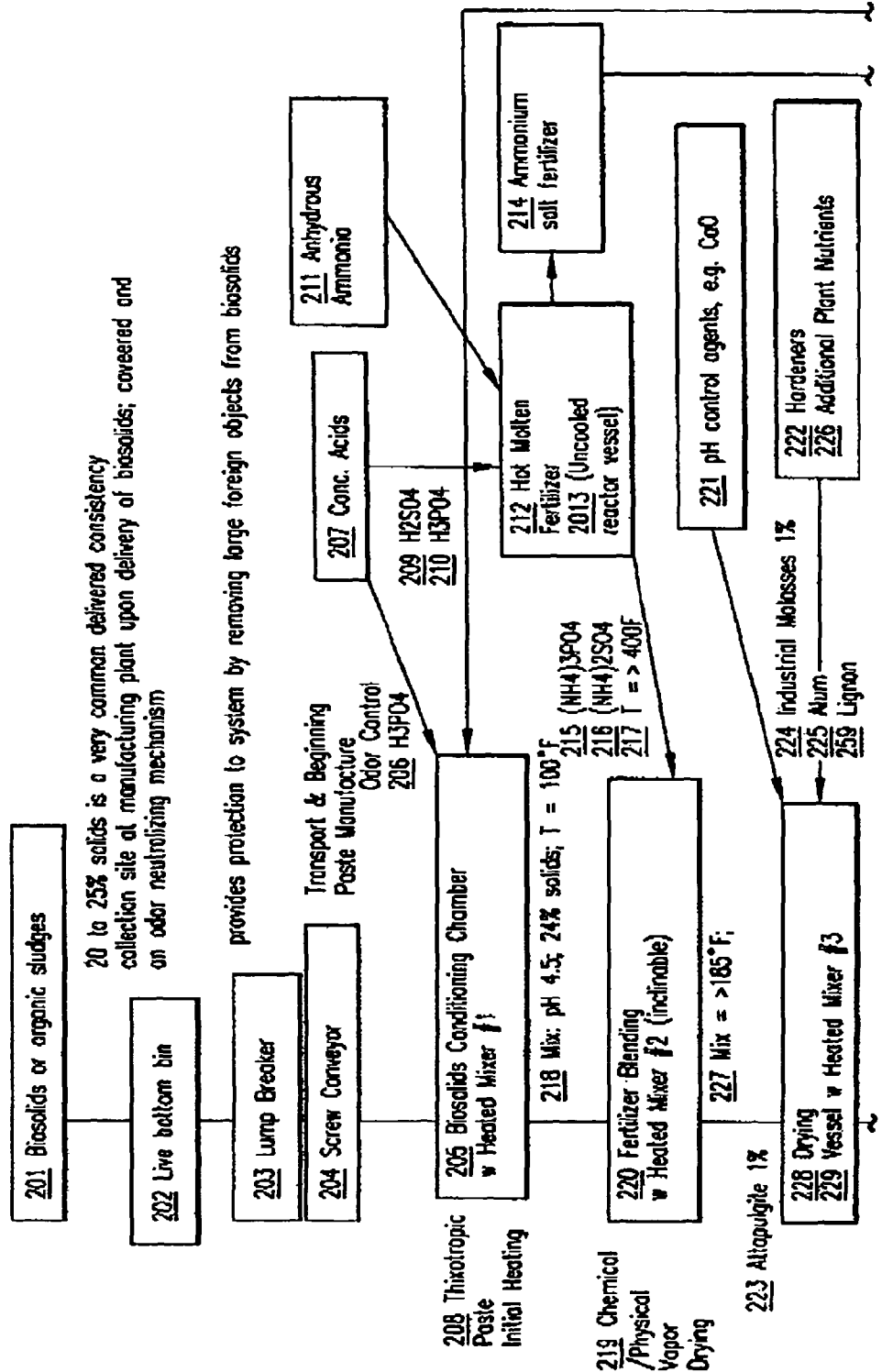
Figure 2B:
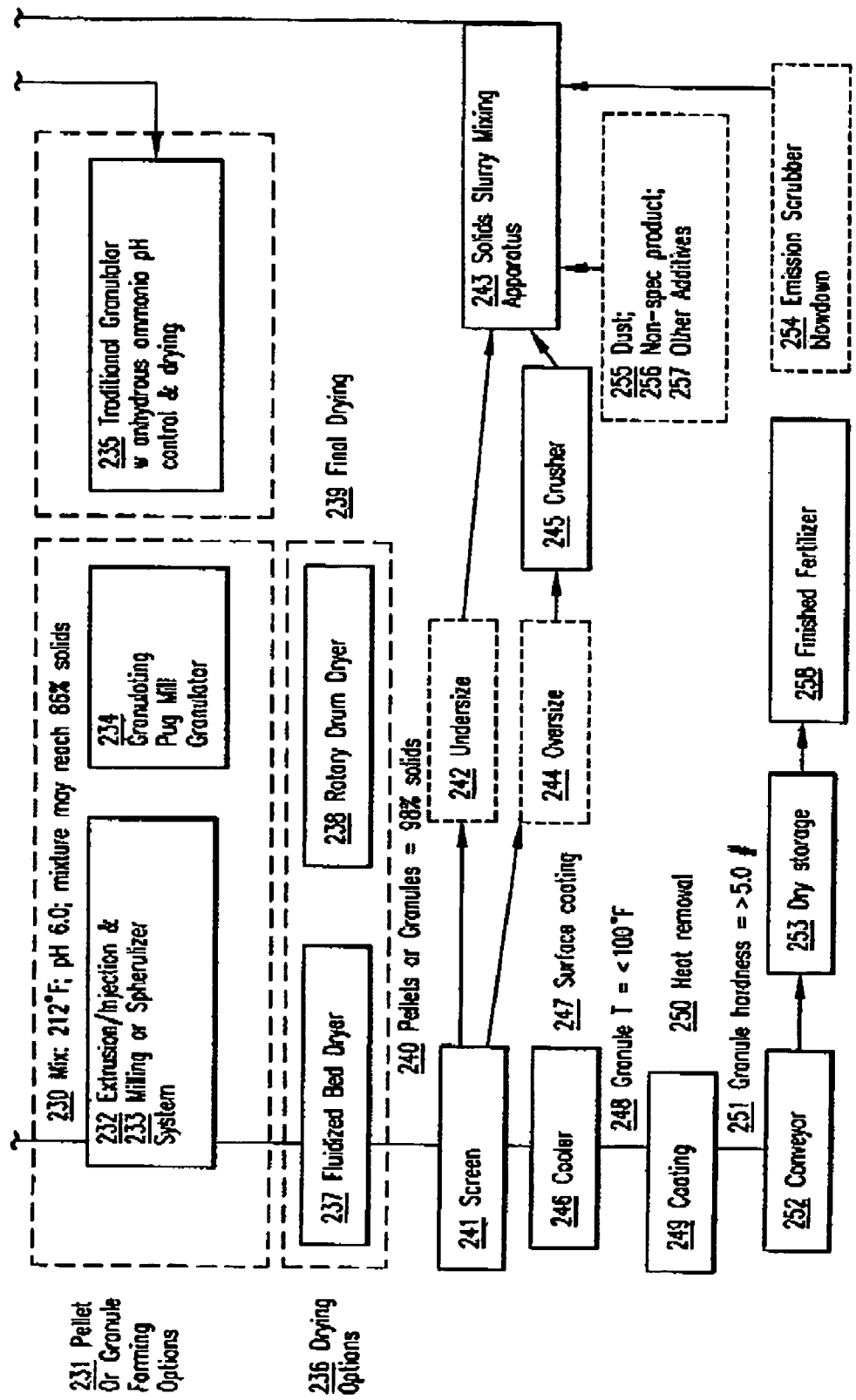

In a preferred embodiment of the present invention, as shown in FIG. 2, the process of the present invention utilizes dewatered municipal biosolids (201) to augment ammonium salt fertilizers. The biosolids or other organic sludges are delivered to the manufacturing facility either directly through conveyors or pipes or by traditional transportation using truck, train or barge. Upon arrival at the plant the dewatered solids are placed into a live bottom bin (202) for accumulation and storage until processed. Preferably, the delivered solids may be placed in a holding tank and then transferred to the live bottom bin. The biosolids are preferably passed through a lump breaking apparatus (203) to remove any metal or rock or other large foreign objects to protect the pumping and blending apparatuses later used in the process. The solids are then transferred by screw conveyor or pump (204) to the first solids conditioning apparatus (205). This solids conditioning apparatus is preferably a dual shafted heat-jacketed pugmill containing plow-shaped blades angled in such a way as to mix the contents of the pugmill thoroughly as the contents pass through the horizontal length of the pugmill. The mixing process initially conditions the dewatered biosolids by treating it with sufficient mixing energy that a thixotropic paste is created. This material is then conditioned further with acid (207), preferably phosphoric acid (206) and more preferably with concentrated phosphoric acid of at least 50% strength creating an acidic paste.

Mixing with phosphoric acid begins the process of odor control and acidifies the bioorganic material to a level of between pH 4.0 and pH 6.9, preferably between pH 4.5 and pH 5.5, more preferably between pH 4.9 and pH 5.3, and more preferably between pH 5.0 and 5.2. This treatment with phosphoric acid also provides a level of resistance to oxidative heating that occurs upon long term storage of finished product. Heating and mixing in this initial conditioning apparatus will create a thixotropic paste (208). In the first embodiment of the present invention, this thixotropic paste is preferably heated to control odors and prepare the biosolids for blending with molten ammonium salts. Said heat is preferably imparted to the biosolids by means of a heated mixing apparatus wherein the heat is transferred by a heated shaft, heated paddle blades or by a heated jacket surrounding the mixing apparatus body.

It is preferred that the paste or mix exiting this initial mixer achieve the temperature of 27° C. (80° F.), preferably 35° C. (95° F.) and more preferably exceed 44° C. (111° F.). At a temperature of 44° C. (111° F.) the destruction of microorganisms is commenced along with the enhancement of fluidity and plasticity of the mix. The establishment of higher than ambient temperatures in the bioorganic material facilitates its later homogenous blending with the hot melt of ammonium salts and ensures that the heat energy contained in the ammonium salts is advantageously used to kill or sufficiently inactivate at least all harmful pathogens (bacterial, viral, fungal and parasitic) that were contained in the bioorganic material, especially municipal biosolids. Further, the preheating of the thixotropic or plastic bioorganic paste permits sufficient heat in the blend to occur in a subsequent mixer (220) such that partial denaturation of proteins and hydrolysis of organic molecules that were contain molecules the bioorganic material is facilitated. The high stress, pressure and temperature of the invention sterilizes the bioorganic materials for a safer, less harmful fertilizer. Sterility is measured by lack of detection of viable microorganisms.

Plow, blenders, pugmills or mixers (205, 220, 229) are horizontal mixing chambers having plow-shaped blending elements mounted on a powerfully driven shaft or shafts that rotate at a high speed which divide, mix, back-mix and re-divide the materials to be blended thousands of times a second to yield a thorough, uniform blend with reliable consistency. The blenders, pugmills and mixers used in the processing sequence are each independently heated via a heated shy and or heated screw blade mechanism or heated by means of a jacketed sleeve around the apparatus. Heating is adjustable to provide a heated paste prior to blending with the hot ammonium salt. Such heating can also be applied to the plow blending apparatus that carries out the blending of the hot ammonium salt with the thixotropic paste of conditioned biosolids. Heating can also be applied to the plow blending apparatus following blending of the hot ammonium salts with the paste wherein hardeners and pH adjustment agents are added. If necessary to achieve additional drying it is taught herein that a final Mixing Apparatus (Mixer #3, 229) with vacuum or negative pressure venting is used to further withdraw steam and water vapor from the mix in order to reach the proper percent solids for use with specific injection or extrusion equipment.

Vigorous mixing such as conducted with plow blending or similar thorough mixers guarantees a mix with the proper consistency for injection or extrusion with the contact time necessary for temperature development to a minimum of 100° C. (212° F.) for between 5 and 60 seconds with the preferred range of 10 to 30 seconds with a more preferred range of 15 to 20 seconds with the optimum time being about 16 seconds (227). If throughput is such that these times cannot be accommodated, then a redundant blending apparatus can be placed in parallel to handle such a volume.

If the hot melt of ammonium salts (212) is manufactured and is not directly obtained from a separate commercial manufacturing process, anhydrous (99% ammonia) or aqueous (18-30% ammonia but most commonly at 21% at atmospheric pressure) ammonia (211) is blended with a mix of concentrated phosphoric acid (210) and concentrated sulfuric acid (209) in an uncooled reactor (213) of the type developed by the Tennessee Valley Authority (TVA) and then directly discharged into a second heated plow blender/mixer (220) for blending with the conditioned biosolids to prepare the molten ammonium salts. The melt of ammonium salt (215, 216) is preferably at a temperature greater than 177° C. (350° F.) and preferably at a temperature greater than 232° C. (450° F.) and more preferably at a temperature of greater than 288° C. (550° F.) (217). The use of an uncooled reactor for the manufacture of the fertilizer melt provides for maximum throughput for fertilizer production the rate of which is uncoupled from the rate of blending with the conditioned bioorganic material and which may provide melt for the production of pure ammonium salt fertilizer (214) without augmentation of bioorganics. It is preferred that the blend within this mixer #2 achieves processing temperatures of a minimum of 100° C. (212° F.) and that this temperature is held for a total of 16 seconds before the temperature of the blend is permitted to drop. It is more preferred that the temperature of the blend achieve 121° C. (250° F.) and it is more preferable that the temperature of the blend achieve 149° C. (300° F.). When these higher temperatures are achieved the total processing time at the higher temperature may be reduced to 10 seconds but the blend must still be greater than 100° C. (212° F.) for 16 seconds total. It is preferred that the time of temperature contact above 100° C. (212° F.) be a time greater than 16 seconds but it is more preferable that it be for a time greater than 30 seconds and even more preferable for it to be a time greater than 60 seconds. The minimum of 16 seconds is preferred because the USEPA has indicated in 40 CFR Part 503 that time temperature contact for a material such as the bioorganic material used in the present invention be 15 seconds or greater.

The said blending or mixing apparatus #2 combining the thixotropic sludge paste with the hot ammonium salts to create a second mixture is inclined such that the head pressure within the mixing vessel increases. Further, this head pressure combines with an increase in atmospheric pressure within the same vessel due to production of steam and water vapor emitting form the heated mix such that chemical alterations of molecules occur within the mixer. The total pressure within the vessel is further controlled by regulation of the exit aperture size and by the control of any exiting gases from the mixer #2. Such chemical alterations due to combined heat and pressure includes partial denaturization of protein molecules and the hydrolysis of some protein molecules and the hydrolysis of other organic compounds. Such denaturization or hydrolysis of organics results in the creation of a safer final product because of the loss of biological activity associated with such compounds such as pharmaceuticals, hormones and other biologically-active organic compounds that were present in the biosolids.

Following achievement of said times of exposure the venting of the steam and water vapor emitted from the mix can take place (228). This preferably occurs at the distal end of the mixer (220) and or in subsequent optional drying mixers (228) and or may take place in an additional dryer/mixer (229).

Further, the use of an uncooled reactor (213), which as per design of the TVA preferably includes the input of scrubbing blowdown fluids (254) and which provides the opportunity for the majority of the exothermically created heat to be transferred with the melt to the blending apparatus for mixing with the biosolids thixotropic paste. In this embodiment, the scrubbing blowdown fluids (254) are mixed in a mixing apparatus (243) with other residuals including dust (255), non-specification product (256) as in product that is too small or undersized (242) or oversize material (244) that is crushed in a crashing or mill apparatus (245) or may include other additives, e.g., iron (257) that a customer would prefer be added to the composition of the finished fertilizer. The output of this mixer is then added to any of the blending mixers (205, 220, 229) with a similar chemical result. The decision of the which mixer to add the additive depends upon the heat sensitivity of the additive and whether or not it is added before the heated blending process in mixer #2 (220) or later when temperatures are declining with steam and water vapor removal (228).

Water is removed from the blending apparatus (220, 228) by a combination of chemical and physical interstitial vapor separation forces (219) under vacuum or negative pressure atmospheric conditions. The water molecules in this superheated condition will convert to steam and try to exit the mix to the atmosphere as the mix is turned and folded within the blending apparatus. A low vacuum can facilitate this transfer and haste the dig process however a vacuum usually requires the production to be in a batch mode rather than continuous throughput.

Prior to the completion of the drying process a hardener or hardeners (222) which agglomerate the mix and contribute to the hardness of the finished dried pellet or granule (258). The hardener or hardeners are selected from the group comprise of attapulgite clay (223), lignon (259), industrial molasses (224) and alum (225) among others.

Optionally, dependent upon the requirements of the customer, additional plant nutrients, (226) for example, potash or other forms of potassium e.g., potassium hydroxide, are preferably added at this step in the blender apparatus.

In addition, pH control agents (221) are added to this mixer in the form of one or more of group of alkaline materials such as calcium oxide, calcium hydroxide, potassium hydroxide, or other metal oxides or metal hydroxides, anhydrous ammonia, cement kiln dust, lime kiln dust, fluidized bed ash, Class C fly ash and Class F fly ash addition to raise the pH of the mix. The fertilizer product of the present invention preferably has a pH of between 5.0 and 7.0, more preferably between pH 5.5 and pH 6.5 (230), and more preferably between pH 5.7 and pH 6.3.

Drying is sufficient for extrusion or injection (232) within this third mixer. An additional drying mixer #4 (not shown) is preferably provided which also may contain a jacketed or paddle heating mechanism.

The remainder of the processing for pellet or granule production (231) includes standard fertilizer granulation technology (235) especially for high volume throughput plants. The pellet or granule product, especially in smaller throughput plants considered to be those of less than 300 tons product production per day, involves more innovative technologies such as injection or extrusion (232) followed by milling or spherulizing (233) the pellet or granule or involves simple discharge from a granulator or granulating pug mill (234). When a granulator or granulating pug mill is used, it is preferable to feed some dry seed material, i.e., dry fines or sub specification material of the fertilizer product, into the granulator to serve as the nucleating core of the granules.

In another preferred embodiment, the partially dry granular material is injected directly into a vertical fluidized bed dryer (237) or rotary drum dryer (238) as manufactured by several commercial companies to produce dry granules.

Drying options (236) for final dying (239) are conducted using a horizontal fluidized bed dryer (237), or a rotary drum dryer (238). The dried pellets or granules (240) which are greater than 90% solids and preferably are greater than 95% solids and more preferably are greater than 98% solids are then sized through one or more screens (241). The proper sized material is separated and then cooled in a cooling apparatus (246) to less than 110° F. and more preferably to less than 38° C. (100° F.) (246) before being coated in a coating apparatus (249) with a deduster material (247) to prevent dust generation during transport, storage and application and then conveyed (252) to storage (253) as finished bioorganic augmented inorganic fertilizer (258) until shipment from the manufacturing site. Properly coated and dried pellets or granules have a hardness of greater than 5 pounds crash resistance (251) in order to resist dusting and handing during transport, shipment and application. This embodiment also anticipates that when deduster coating material requires a certain temperature to maintain a molten condition for application that the coating apparatus (249) will actually be placed ahead of the cooler (246) in order to coat hot granules and achieve an even coating prior to the then coated granules being cooled in a cooling apparatus.

The cooled granules are preferably at temperatures between 38° C. (100° F.) and 66° C. (150° F.) but preferably less than 49° C. (120° F.) when they are discharged to the granule storage facility. The granule storage facility must be dry to prevent agglomeration of the granules leading to degradation and destruction.

The fertilizer of the present invention is preferably chemically adjusted to fit the needs of high nitrogen fertilizer requirements containing significant amounts of phosphate, sulfur and iron to enhance the targeted nitrogen (N) content of between 6% and 18% percent by weight permitting significant commercial valuation.

Figure 3A:
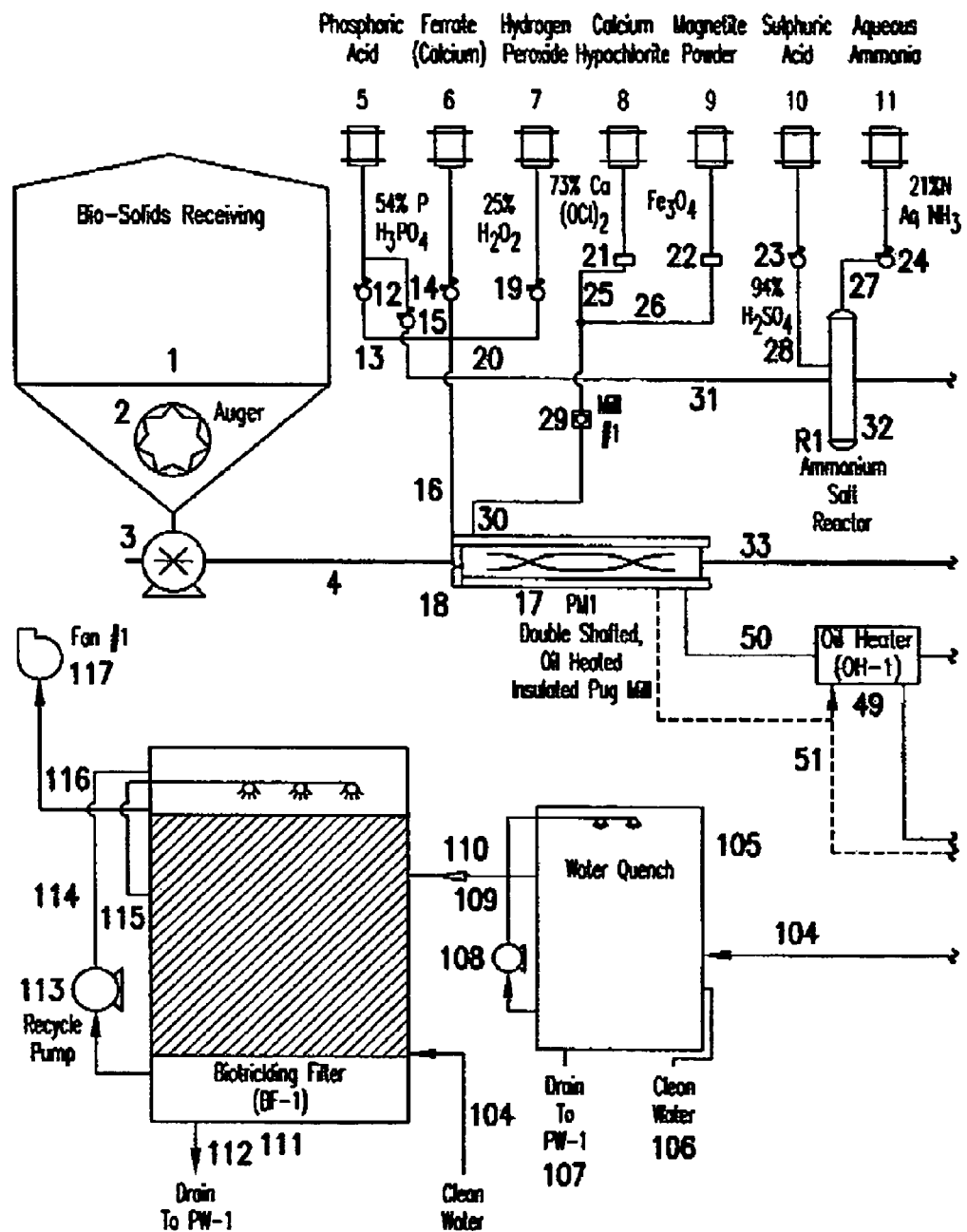
FIG. 3 Schematic overview of the fertilize production process using recycled materials.
Figure 3B:
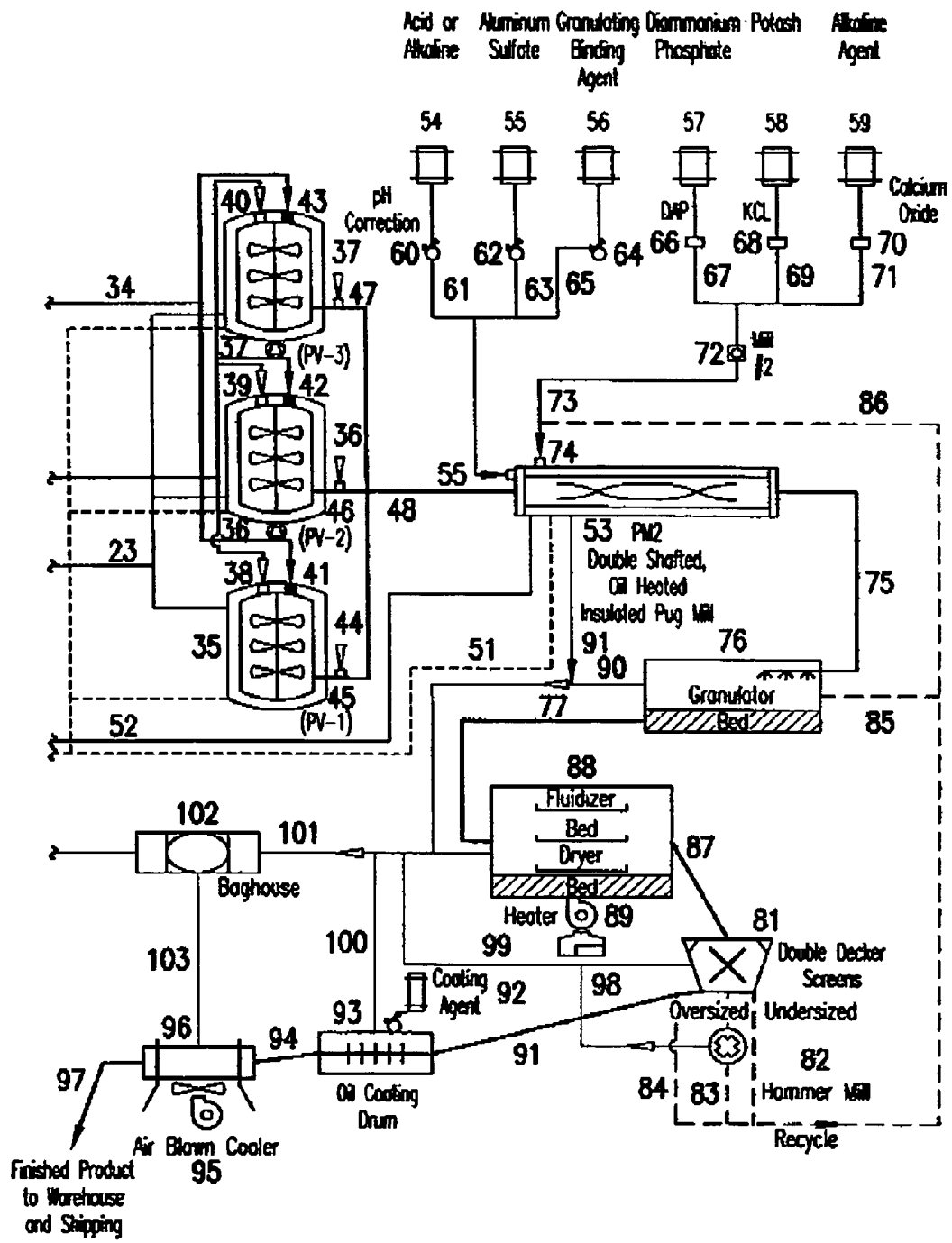

Another preferred embodiment of the present invention is basically similar to the first embodiment but contains some important modifications that provide more control and versatility to the process, as shown in FIG. 3. Municipal biosolids or organic sludges are received into a live bottom bin (1). This is sized to accept up to one full 20 ton container of biosolids as this is a common method of transporting biosolids from the municipal wastewater it plant (WWTP) to the biosolids processing site. The live bottom bin contains one or more augers (2) that move the biosolids to a pump (3) which moves the sludge at a defined rate (4) to the first mixer (17) where the biosolids are conditioned and prepared for later blending with molten fertilizer. This mixer is preferably a pugmill configured with double shafts that is preferably hollow to accept heated oil which will begin the process of heating the biosolids.

Alternatively, heat is applied through a jacket configuration around the pugmill with heated oil (50) supplied by an oil heater (49). This pugmill #1 (17) has on its anterior end an injection ring (18) which permits the addition of liquid materials to the biosolids also entering the pugmill. There are several preferred additions that are made to the biosolids in pugmill #1. The first of these is the addition of phosphoric acid (5) via pump (12) at a rate (13) acidifies the organics present in the biosolids and significantly assists in the odor control of the biosolids resulting in less sulfides being liberated throughout biosolids processing and less reduced sulfur compound odor, e.g., hydrogen sulfide or mercaptan, being detectable in the finished product. Acidic conditioning of the biosolids is useful in processing the biosolids for several reasons. Additionally, the addition of phosphoric acid helps to prevent oxidative heating of the finished product when this product is stored statically for long periods of time.

This initial acidification imparts a stress on the microorganisms present in the biosolids creating an adverse environment which sensitizes them to later further stresses facilitating their destruction. Also it is important to note that this phosphoric acid (5), as well as the iron added in the ferrate (6) and the iron oxide, also known as magnetite ($Fe_3O_4$) (9) contribute important plant nutrients to the fertilizer mix. The liquid acid is added to the biosolids through insertion ring (18) into pugmill #1 (17) via lines (16, 30). Addition of acid in this step is preferably performed with the use of concentrated sulfuric acid although this acid tends to create additional reduced sulfur compounds like hydrogen sulfide or mercaptans during processing some of which can end up in the finished product and create problem odors.

The next additives are the odor control elements that are added to the biosolids to control or eliminate the traditional musky nitrogenous odor of dried biosolids. Ferrate (sodium or calcium) (6), a liquid is added as a very strong oxidant to control reduced sulfur compound and nitrogenous odors present in the biosolids. The calcium (or sodium) ferrate is added from apparatus (6) at a rate (15) through control of a pump (14). This oxidative agent is very effective at destroying the odorants present in the biosolids when used at 1 to 10 percent and preferably at 2 to 5 percent of the volume of wet biosolids entering the pugmill #1. The ferrite is known to react very effectively with reduced sulfur compounds present in the biosolids mix. It also is a strong enough oxidant to actually denature proteins and is even capable of disrupting the bonds between amino acids. Such denaturing of proteins and disruption of molecular bonds can alter the odorant characteristics of the biosolids mix thereby improving the odor of the resultant product of the invention.

Additionally, two other oxidative materials are preferably added in this embodiment. Liquid hydrogen peroxide (7) at 25 to 50% concentration is added by control of pump (19) at a rate (20) via pump (22), between 1% and 5% of the biosolids delivery rate (16) to injection ring (18) into pugmill #1 (17). Preferably, calcium hypochlorite (8), a solid, may be delivered by screw conveyor to a pulverizing mill (29) and then to an additive port (30) at a rate (25) equal to between 1% and 5% of the volume of biosolids entering the pugmill #1. An additional odor control agent, iron oxide, $Fe3O4$, also known as magnetite (9), a solid, is preferably added using a screw conveyor (21) at a rate (26) to a mill (29) to pulverize and powder these additives prior to addition to pugmill #1 at the additive port (30). Use of the mill is important in opting these solids materials for contact with the odorant molecules present in the biosolids.

In another preferred embodiment the order of these odor control and conditioning agents can be changed. For example, it has been round that addition of the ferrate, and or hydrogen peroxide, and or iron oxide can occur prior to the addition of the acid, e.g., phosphoric acid, into pugmill #1 has produced excellent odor control results as well.

As the biosolids enter mixer or pugmill #1 (17) at a rate (16) they are aggressively mixed and converted to a thixotropic paste-like material that easily reacts with the acid and odor control agents also added into pugmill #1. This pugmill is long enough and has sufficient retention time to accomplish this conversion. Preferably, this mixer is a pugmill. Plow blenders, pugmills or mixers are horizontal mixing chambers having plow-shaped blending elements mounted on a powerfully driven shaft or shah that rotate at a high speed which divide, mix, back-mix and re-divide the materials to be blended thousands of times a second to yield a thorough, uniform blend with reliable consistency. This and the other plow-blending apparatus' used in the pros sequence are preferably each independently heated via a heated shaft and or heated screw blade mechanism or also heated by means of a jacketed sleeve around the apparatus. Preferably, such heating is adjustable to provide a heated paste prior to blending with the hot ammonium salt, and is also applied to the plow blending apparatus out the blending of the hot ammonium salt with the thixotropic paste of conditioned biosolids.

Preferably, the biosolids are heated as they pass through mixer #1 (17). Said heat is preferably imparted to the biosolids by means of a heated mixing apparatus wherein the heat is transferred by a heated shaft, heated paddle blades or by a heated jacket surrounding the mixing apparatus body. This heating and mixing in this initial conditioning apparatus create a thixotropic paste. It is desired that the mix exiting this initial mixer achieves the temperature of 27° C. (80° F.), preferably 35° C. (95° F.), and more preferably exceeds 44° C. (111° F.). At a temperature of 44° C. (111° F.) the destruction of microorganisms is commenced along with the enhancement of fluidity and plasticity of the mix.

The establishment of higher than ambient temperatures in the bioorganic material facilitates its later homogenous blending with the hot melt of ammonium salts an ensures that the heat energy contained in the ammonium salts are advantageously used to kill all pathogens (bacterial, viral, fugal and parasitic) that were contained in the bioorganic material, especially municipal biosolids. Further, the preheating of the thixotropic or plastic bioorganic paste permits sufficient heat in the blend to occur in a subsequent mixer such that partial denaturation of proteins and hydrolysis of organic molecules that were contained in the bioorganic material are facilitated.

The biosolids mix exits pugmill #1 at a rate (33) and enters one of three pressure vessels. The receiving pressure vessel is designated PV-1. The biosolids mix moves into PV1 (35, 36, 37) at a rate (33) as permitted by values (38, 39, 40). The PV-1 is heated with hot oil (49) passing through a jacket (41, 42, 43) around each of the three pressure vessels. During the filling operation the biosolids mix is agitated by rotating blades (44). Simultaneously with the addition of biosolids a liquid hot or molten ammonium salt mixture enters the PV-1 (35, 36, 37) at a rate (34). The ammonium salt mixture is manufactured in a reactor (R1) (32) by combination of concentrated sulfuric acid (10) and or phosphoric acid (5) with either anhydrous (99% concentration) or aqueous ammonia (11) via pump (24) at a rate (27) ranging between 18% and 30% in ammonia concentration. The sulfuric acid (10) is added with phosphoric acid (5) at rates (28) via pump (23), and (31) via pump (15) restively, such that the amount of ammonium sulfate and ammonium phosphate created when mixed with the biosolids mix will produce a high nitrogen fertilizer, for example, a 15% nitrogen and a 10% sulfur concentration by weight in the final fertilizer product. Further this combination of sulfuric acid and phosphoric acid is controlled such that a small amount of acid is in excess of the amount of ammonia also added to the reactor. This will permit the finished ammonium salt mix to have an exit pH of approximately pH 5 to pH 6.5 and preferably about pH 5.5 to pH 6.0. The size of the reactor is set such that sufficient resident time occurs for the reaction between the acids and the ammonia to go to completion.

The reaction between the acids and the ammonia is violently exothermic. The reaction creates high heat which maintains the resultant ammonium salt in the soluble molten state with any water present in the form of superheated steam. This violent exothermic reaction also will create significant pressure within the pressure vessel. This ammonium salt mix has a temperature characteristic that is greater than 121° C. (250° F.) and less than 316° C. (600° F.) dependent upon the nature of the ammonia being used in the reaction. If anhydrous ammonia is used the temperature will be significantly higher than when aqueous ammonia, especially at 21% N, is used. Anhydrous ammonia is advantageous but presents significant permitting problems when the plant is sited close to a residences and businesses in a municipality. For this reason, the present invention incorporates the use of aqueous ammonia which is inherently safer and readily permitted for use in such manufacturing processes. The temperature of the ammonium salt is such that when it is blended with the biosolids mix in the receiving pressure vessel 39 the temperature of the blend will exceed 100° C. (212° F.) and preferably exceed 149° C. (300° F.) and more preferably exceed 177° C. (350° F.). The higher temperatures facilitate the hydrolysis of proteins and peptides in the biosolids in an acid environment creating advantageous properties to the final fertilizer product that result in increased crop production compared to fertilizers that do not contain such organic material, i.e., ammonium sulfate or ammonium phosphate or urea fertilizers.

When the fill cycle of the receiving pressure vessel is complete the valves 38 and 41 close and the pressure vessel is designated PV-2 or the reaction vessel 42. The time in the reaction vessel equals the time that the biosolids took filling and in in PV-1 (39) The time is greater than 60 seconds and less than 15 minutes. Preferably the system is set up such that the resident time in each vessel is at least 5 minutes. During the resident time in PV-2 the blades (44) are continually mixing the contents of the pressure vessel which because of the exothermic reaction occurring is under significant pressure. This pressure is of the range of 20 to 300 pounds per square inch dependent upon the level of exothermic reaction permitted. When anhydrous ammonia is used with concentrated acids the pressure ranges from 50 pounds to over 300 pounds per square inch. When aqueous ammonia at 21% N is used the atmospheric pressure ranges from 20 pounds per square inch to 100 pounds per square inch. When the resident time in PV-2 is up the biosolids-ammonium salt blend the pressure vessel and its contents are designated pressure vessel 3 or PV-3 for the emptying cycle. The emptying cycle is equal in time to the filling cycle and the reaction cycle. During the emptying cycle, valves (45, 46, 47) open such that the biosolids move to Mixer #2 or Pugmill #2 (54) at a rate (48).

In summary, the reaction phase of the process of the present invention utilizes three pressure vessels, each of which is capable of performing all the same functions, but each operates in sequence such that one is filling, one is reacting and one is emptying, all at the same rate. This manufacturing system is considered a batch system with regard to the reactions that occur in the pressure vessels hence the need for at least three to be operating at the same time.

The fertilizer mix exits the pressure vessel system at a rate (48) and enters pupil #2 (53). In pugmill #2 various materials are added to bring the nutrient concentration of the finished product up to the required specification, to increase the hardness and granularity of the finished product and to adjust the pH of the mix to the correct pH as required by the specification of the finished fertilizer product.

The solid nutrients that may be added include urea, ammonium nitrate, mono-ammonium phosphate, diammonium phosphate (59), and or potash (KCL) (58). The solids use to adjust the pH are preferably principally alkaline agents (59) selected from the group comprised of calcium carbonate, sodium hydroxide, calcium oxide, cement kiln dust, lime kiln dust, Class C fly ash, class F fly ash, multistage burner ash, alum, alum sludge from water treatment and wood ash. These are added via screw conveyors (67, 112, 70) at specific rates for each compound, diammonium or mono ammonium phosphate (109), potash (58) and the alkaline agent at a rate (71). These solids are conveyed to a pulverizing mill (72) to increase the efficiency of blending and reaction with the fertilizer mix entering the pugmill (53) from the pressure vessels. The powder is then transported via a screw conveyor at combined rate (73) to enter the pugmill (53) at aperture (74).

The liquid additives preferably include nutrients such as UAN (urea ammonium nitrate) and soluble urea (both not shown). The liquid additions also include pH adjustment materials such as acids (54), e.g., phosphoric acid or sulfuric acid, or caustic solutions, e.g., sodium hydroxide. These are pumped (60, 62) at respective rates (61, 63) to the injection ring (55) to enter pugmill #2 (54). Preferably, a granulating binding agent (56) is injected at a rate (65) via pump (64).

The pugmill #2 preferably is jacketed to heat the fertilizer mix within to prepare the mix for injection into the granulator (76). The heat is applied though hollow paddles within the pugmill or by a jacketed chamber around the pugmill heated with hot oil (49). Exhausted oil is returned to the oil heater through pipes (51) from pugmill #2 (53), the three pressure vessels (35, 36, 37) and pugmill #1 (17).

The pugmill #2 is long enough and has sufficient retention time and agitation via the preferred double shafted plow blending paddles to blend the additives with the fertilizer mix and insure the retention of sufficient heat to achieve effective granulation in the granulator (76). The heated mix is discharged to the granulator at rate (75). The temperature of the mix is in the range of 212° F. to 350° F. and preferably in the range from 250° F. to 300° F. Further the percent solids of the fertilizer mix is controlled by the withdrawal of steam and water vapor via (85). The computer controlled removal of water is such that the fertilizer mix is the correct solids for granulation in the granulator (76). The percent solids of the mix is in the range from 40% to 80% with the preferred range from 50% to 70% and the more preferred range from 60% to 75%.

The fertilizer mix exits pugmill #2 (53) at a rate (75) and is sprayed on a seed bed within the granulator (76). This bed is hot and is comprised of fines of the finished product obtained from the undersized product (82) and the pulverized oversized material (84) as well as from finished product meeting specifications (83) that has to be returned to the granulator to provide sufficient bed to keep granulation as a continual flow process. Granulation also represents a significant dewatering process with steam and water vapor being drawn off (90). This steam and water vapor joins at from pugmill (53) and the outputs from the fluidized bed dryer (88) and the screen system (81), mil (53) and oil coating drum (93) to pass through the bag house (102) to remove particulates as part of the emissions control system of the process. The retention time in the granulator is not critical to the process but preferably ranges between 2 minutes and 15 minutes.

The granular fertilizer mix exits the granulator (76) at a percent solids range of 80% to 94% and preferably in the range of 85% to 94%. The temperature of the exiting mix is between 85° C. (185° F.) and 107° C. (225° F.) although this range is not critical for operation of the fluidized bed (88) or rotary drum (not shown) dryer. The retention time in the dryer is between 5 and 25 minutes depending upon the design and size of the dryer. The dryer illustrated in FIG. 3 is a vertical fluidized bed dryer which operates by keeping the drying fertilizer granules in suspension while hot air passed upward past them removing water and increasing dryness to the specified level. The range of dryness of the product is from 90% to 100% with the preferred range from 96% to 99%.

The dry granular fertilizer is then passed (89) to the screen system (81) where the specification size is removed at rate (82) for coating with hot oil. The specification size may be varied dependent upon customer requirements, however, the range of suitable product for sale is between 0.7 mm and 3.2 mm with the commercial range for normal sized fertilizer is between 2 mm and 3 mm. The present invention also can manufacture a minimal sized product suitable for use in golf course applications which ranges from 0.7 mm to 1.3 mm. The undersized material is directly conveyed back to the granulator (76) at a rate (85) and or to pugmill #2 (53) on conveyor dependent upon the need to increase solids in pugmill #2 prior to the fertilizer mix entering the granulator at a rate (75). The oversized material is conveyed to hammer mill or mill (82) where it is pulverized and returned to either the granulator via common conveyor and or to the pugmill #2 (53) via conveyor.

The specification product is conveyed to a oil coating apparatus, e.g., a coating drum (93) or spray system. The coating oil or material is contained in a container (92) that may be heated if the said coating oil or material requires application at greater than ambient temperature. The coated granules which are still hot then pass to a cooler apparatus (96), e.g., air blown cooler (95) for reduction in temperature to less than 66° C. (150° F.) and preferably to less than 54° C. (130° F.) and more preferably to less than 110° F.

Following cooling the finished product is weighed (not shown) and conveyed to dry storage pending shipment (97). The finished product is a sterile fertilizer having substantially no detectable amount of viable microorganisms, such as *E. coli* or streptococci, harmful to animals or humans. Substantially no viable microorganisms means that the fertilizer is non-toxic and has no detectable amount or a detectable amount well below a threshold for safe handling and use.

The process air is filtered in the bag house (102) while still hot enough to carry the removed water as vapor is passed to a condenser (105) where the air is cooled with clean water (106) and recycled water at a rate (104) sufficient that the water vapor is converted to liquid which is removed (107) from the process to a sewer or water treatment system prior to discharge to the environment. The process air following condensation is passed at rate (110) to a biotrickling filter (111) for final removal of all odorants. This unit employs a medium with microorganisms using clean water (104) and process water (not shown) mixed with the proper nutrient at rate (114) to wet the medium and feed the microorganisms. Air is recycled (115) to provide sufficient retention time until odors are removed prior to discharge (116) to an exhaust fan (117) for discharge to the environment.

The following examples illustrate embodiments of the invention, but should not be viewed as limiting the scope of the invention.

EXAMPLES

Municipal anaerobically digested biosolids that had been previously dewatered to 26% were received in a 20 ton container transported by truck. The biosolids were dumped directly into a live bottom bin in the truck receiving area of the manufacturing plant Augers in the live bottom bin facilitate moving the biosolids to a positive displacement pump which then pumps the sludge at a rate of 5.77 tons per hour to the first pugmill for conditioning and mixing. This manufacturing plant is set up so that 5.77 tons of wet biosolids (26%) will create 5 dry tons of finished fertilizer product at a fertilizer value of 15-3-3-10-2-14 (N—P—K—S—Fe— Organic). This fertilizer competes well on the national and international commodity fertilizer marketplace.

This first pugmill was configured with double shafts comprising plow shaped blades that aggressively mixed and kneaded the biosolids into a thixotropic paste-like material with both a rotary and back and forth action. Heat was applied to the pugmill via hot oil which was at 350° F. The hot oil flowed through a steel jacket surrounding the pugmill and warmed the biosolids to approximately 90 F. Initially, 4% by weight concentrated phosphoric acid (agricultural grade at 54% P) was added to the biosolids in pugmill #1. This acid treatment acidified biosolids and began the odor treatment, imparting some resistance to oxidative heating and adding phosphate nutrient for later value. Next, calcium ferrate (an aqueous solution containing 4% ferrate ion) was pumped from a reservoir filled from a ferrate generator supplied by Ferrate Treatment Technologies at the rate of 4% by volume of the biosolids, i.e., at 360 pounds of 4% ferrate solution. In addition, 2% by weight of the initial biosolids of granular calcium hypochlorite was pulverized with a small hammer-mill and then added to pugmill #1 as well to flier oxidize the reduced sulfur compounds aid the organic odorants present from the biosolids.

The output of pugmill #1 was a conditioned, warm, blended thixotropic homogeneous mix. Its odor had been reduced drastically at this point the process. The conditioned biosolids mix exited pugmill #1 at just over 9500 pods per hour and entered one of three stainless steel Pressure Vessels. While the biosolids were reacted in pugmill #1, a second and independent chemical synthesis was taking place in a different vessel. Enough concentrated sulfuric acid at 94% was added to a reactor vessel along with concentrated phosphoric acid (54% P or agricultural grade) in amounts which resulted in a slight excess of acid following the complete addition of the base, aqueous ammonia. The reaction was set up so the exiting pH of the completed fertilizer mix was close to pH 5.7. Simultaneous to the input of the two acids, aqueous ammonia at 21% N was also pumped into this chamber. The concentrated acids reacted with the aqueous ammonia to form ammonium salts of ammonium phosphate and ammonium sulfate.

Because the reactions occurring in this chamber were very exothermic the heat rises rapidly to 177° C. (350° F.). This very hot aqueous ammonium sulfate and ammonium phosphate was added to pugmill #1 at the same time the biosolids entered the pressure vessel. After about 5 minutes the two valves controlling the input of these materials closed and the temperature and pressure within the vessels begin to increase. The intense interaction between the hot ammonium salts and the biosolids was allowed to continue for about 5 minutes while the mixture was agitated continuously to facilitate reactions and a blending of all the components. The pressure within the pressure vessel was monitored and rose to 75 pounds per square inch. During this time the internal chemical heat created was augmented by 177° C. (350° F.) hot oil circulating rough a jacket around the exterior of the pressure vessel. At the end of 5 minutes a value controlling the exit from the pressure vessel was opened and the new fertilizer mix was pumped out of the pressure vessel into a second heated double shafted pugmill set up similar to pugmill #1. At this point in time the percent solids of the fertilizer mix was approximately 42% and the temperature of the mix is about 160° C. (320° F.). Because of the addition of significant amounts of ammonium salts to the conditioned biosolids within the pressure vessel the amount of new fertilizer mix entering pugmill #2 was just under 9 tons per hour.

The high temperatures with physical agitation in the press vessel facilitated the partial hydrolysis of proteins and peptides in the biosolids in an acid environment creating advantageous properties to the final fertilizer product that resulted in increased crop production compared to fertilizers that do not contain such organic material, i.e., ammonium sulfate or ammonium phosphate or urea fertilizers. This pressure vessel system was operated in batch mode as, while one pressure vessel was filling, a second pressure vessel was pressurized and reacting and a third pressure vessel was simultaneously in the process of emptying in this way the new fertilizer mix was continually produced.

In pugmill #2 potash (KCL), a solid, was conveyed by screw conveyor to a mill where it was pulverized prior to addition trough a port in the top of the pugmill. The amount of potash was 441 pounds per hour which will yield about 3% potassium by weight in the finished fertilizer product. This fertilizer process also added some iron oxide in be form of $Fe_3O_4$ to the pugmill #2 at this point. This solid was conveyed to the hammermill and then added directly to the pugmill #2 through the addition port on the upper side of the apparatus along with the potash and the other solid additive, Class C fly ash. Class C fly ash was also being added to pugmill #2 at the rate of 180 pounds per hour to bring the pH of the fertilizer mix to pH 6.3. The fly ash was conveyed from its container though the pulverizing mill and then to an aperture on the upper side of pugmill #2. Additionally, 10.2% of the wet weight of the initial biosolids, i.e., 918 pounds per hour, of a 60% solution of commercially-obtained lignon was pumped from its reservoir directly into the injection ring in the anterior end of pugmill #2. Pugmill #2 was also heated via a hot oil circulating jacket to maintain the temperature of the mix to at least 295° F. prior to its injection into the granulator.

The pugmill #2 was long enough and had sufficient retention time and agitation via the preferred double shafted plow blending paddles to blend the additives with the fertilizer mix and insure the retention of sufficient heat to achieve effective granulation in the granulator. The percent solids of the fir mix was controlled by withdrawing some steam and water from the headspace of pugmill #2 which increased the percent solids of the mix as it entered the granulator. At the time of entering the granulator the mix was about 49% solids. The heated mix was discharged from pugmill #2 into the granulator at rate of 7.2 tons per hour. The bed of the granulator contained about 21 tons of hot dry seed material comprised of fines recycled from the product screens and an amount of finished product that had to be milled to bring the total seed in the granulator bed to the 21 ton total. This 3:1 ratio of input material to bed weight in this example is a little thin and the granulator is actually sized to increase the ratio to 6:1.

A significant amount of steam and water vapor was removed from the atmosphere in the interior of the granulator. This steam and water vapor joined that from pugmill #2 and the outputs from the fluidized bed dryer, the screen system, the product oversize mill and the exhaust from oil coating system to pass through a bag house to remove particulates as part of the emissions control system of the process. The retention time in the granulator was approximately 4 minutes.

The granular fertilizer mix exited the granulator at a percent solids range of 88% and the temperature of the exiting mix was 88° C. (190° F.) prior to entering the vertical fluidized bed dryer. The retention time in the dryer was about 21 minutes with the initial hot dry air passing over the granules was 185° C. (365° F.). The dryer operated by keeping the drying fertilizer granules in suspension while hot air passed upward past them removing water and increasing dryness to the specified level. The granules at the completion of drying were 97% solids.

The dry granular fertilizer was passed to the screen system where the product size granules, i.e., 2.0 to 3.0 mm diameter was removed for coating with hot deduster oil. The undersized material was directly conveyed back to the granulator and or to pugmill dependent upon the need to increase solids in pugmill #2 prior to the fertilizer mix entering the granulator. The oversized material was conveyed to a hammer mill where it was pulverized and then returned to the granulator and or to the pugmill via conveyor.

The proper sized product was conveyed to an oil coating apparatus e.g., a coating drum or spray system. The coating oil or material is contained in a container that was heated to about 88° C. (190° F.) to keep the deduster coating oil in a fluid sate. The hot oil was applied to the granules at the rate of 12 pounds per ton of dry granules. The coated granules which were still hot then passed to a rotary drum cooler which was cooled by ambient air to reduce the temperature of the granules to about 46° C. (115° F.). After cooling the cooled granules were weighed to verify that 5 tons per hour were being manufactured and then they were conveyed to dry storage pending loading into 1 ton super sacks and or loading into 20 ton containers for shipment to wholesale fertilizer dealers. Coating dry granules is advantageous to prevent dust generation and degradation of granules.

The process air from the dryer, the granulator, the pugmill #2, the cooler, the oil coating apparatus and the product oversized mill was filtered in the bag house while still hot (about 116° C. or 240° F.) enough to carry the removed water as vapor. The exit of the baghouse was passed to a condenser where the air is cooled with water so that the water vapor is converted to liquid water. This water was discharged to the local sewer to return to the local wastewater treatment plant.

The process air following condensation was passed to a packed bed acid scrubber containing a solution of phosphoric acid and sulfuric acid and then was passed to a caustic scrubber containing a solution of sodium hydroxide. The scrubbed air was then sent to a vertical tan containing a biotrickling filter for final removal of nearly all odorants. The air from the biotrickling filter was discharged up a 38 foot stack for discharge to the environment. The discharged air would be judged satisfactory to be located in a rural or industrial area.

Other embodiments and uses of the invention will be apparent to those skilled in the art from consideration of the specification and practice of the invention disclosed herein. All references cited herein, including all publications, U.S. and foreign patents and patent applications including provisional applications, are specifically and entirely incorporated by reference. It is intended that the specification and examples be considered exemplary only with the true scope and spirit of the invention.

The invention claimed is:

1. A method of manufacturing a fertilizer comprising:
   mixing and heating an organic sludge with a force sufficient to produce a thixotropic paste in a first mixer;
   separately mixing acid with ammonia to produce an acidic mixture;
   acidifying the thixotropic paste with the acidic mixture to produce an acidic paste in the first mixer, wherein the acidified thixotropic paste is heated to a temperature exceeding 44° C. and has a pH of less than 5.5;
   blending the acidic paste and a heated inorganic fertilizer melt comprising an ammonium salt, while maintaining a temperature over 85° C. in a second mixer, wherein the ammonium salt is produced separate from the production of the fertilizer and the melt is maintained at a temperature over 177° C.;
   mixing a pH control agent and a hardening agent with the acidic paste to produce the fertilizer in a third mixer, wherein the fertilizer has a pH of between 5.0 and 7.0; and
   regulating the pressure within the mixers;
   removing water from the fertilizer.

2. The method of claim 1, wherein the melt comprises concentrated sulfuric acid, concentrated phosphoric acid, anhydrous ammonia, aqueous ammonia, or a combination hereof.

3. The method of claim 1, wherein the melt is obtained from a uncooled reactor manufacturing process.

4. The method of claim 1, wherein the sufficient force is provided by kneading action, forward mixing action, back mixing action, double shafted rotating bladed pug mill action, or a combination thereof.

5. The method of claim 1, wherein the acidic paste is heated prior to being blended with the melt.

6. The method of claim 5, wherein the acidic paste is heated in a mixer, pug mill, or plow blender.

7. The method of claim 6, wherein the mixer is heated by a heated shaft, heated paddle blades, a heated jacketed sleeve surrounding the mixer, or a combination hereof.

8. The method of claim 1, wherein the thixotropic paste is blended with concentrated phosphoric acid.

9. The method of claim 1, wherein mixing a pH control agent causes the acidic paste to have a pH value less than 6.0.

10. The method of claim 1, wherein a pH control agent causes the acidic paste to have a pH value less than 5.5.

11. The method of claim 1, wherein the acidic paste is heated to at least 27° C. prior to blending with the melt.

12. The method of claim 5, wherein the acidic paste is heated to at least 35° C.

13. The method of claim 5, wherein the acidic paste is heated to at least 44° C.

14. The method of claim 1, wherein the melt, prior to blending, has a temperature greater than 100° C. by reaction with one or a combination of concentrated acid selected from the group consisting of sulfuric acid, phosphoric acid, anhydrous ammonia, aqueous ammonia, or a combination thereof.

15. The method of claim 14, wherein the temperature is greater than 177° C.

16. The method of claim 1, wherein the melt, after blending, has a temperature greater than 100° C.

17. The method of claim 1, wherein the melt is blended with the acidic paste in a pug mill.

18. The method of claim 17, wherein the pug mill is heated.

19. The method of claim 18, wherein the pug mill is heated to a temperature equal to or greater than 85° C. for between 1 second and 60 seconds.

20. The method of claim 19, wherein the pug mill is heated to a temperature equal to or greater than 85° C. for between 10 seconds and 30 seconds.

21. The method of claim 19, wherein the pug mill is heated to a temperature equal to or greater than 85° C. for between 15 seconds and 20 seconds.

22. The method of claim 18, wherein a combined heat imparted to the acidic paste from the melt and the heated pug mill increases atmospheric pressure within a chamber of the pug mill.

23. The method of claim 22, wherein the increase in atmospheric pressure within the chamber exceeds 20 pounds per square inch.

24. The method of claim 22, wherein the increase in atmospheric pressure within the chamber exceeds 50 pounds per square inch.

25. The method of claim 22, wherein the increase in atmospheric pressure within the chamber exceeds 100 pounds per square inch.

26. The method of claim 22, wherein the increase in atmospheric pressure within the chamber exceeds 200 pounds per square inch.

27. The method of claim 18, wherein a combined heat imparted to the acidic paste from the melt and the heated pug mill produces steam.

28. The method of claim 27, wherein the steam is removed from the pug mill to create a drying effect.

29. The method of claim 28, wherein the steam is removed from the pug mill under negative pressure or partial vacuum.

30. The method of claim 1, further comprising adding one or more plant nutrients to the acidic paste.

31. The method of claim 30, wherein one or more plant nutrients are selected from the group consisting of urea, ammonium nitrate, ammonium sulfate, monoammonium phosphate, diammonium phosphate, urea ammonium nitrate, liquid urea, potash, and combinations thereof.

32. The method of claim 1, wherein one or more hardening agents are selected from the group consisting of ferric oxides, alum, attapulgite clay, industrial molasses, lignon, and combinations thereof.

33. The method of claim 1, further comprising adding one or more oxidizing agents to the acidic paste to decrease odor.

34. The method of claim 33, wherein one or more oxidizing agents are selected from the group consisting of calcium ferrate, sodium ferrate, hydrogen peroxide, chlorine dioxide, and combinations thereof.

35. The method of claim 1, wherein the pH control agent is selected from the group consisting of calcium oxide, calcium hydroxide, sodium hydroxide, potassium hydroxide, anhydrous ammonia, cement kiln dust, lime kiln dust, fluidized bed ash Class C fly ash and Class F fly ash, multistage burner fly ash, alum, water treatment sludge, wood ash, and combinations thereof.

36. The method of claim 1, further comprising forming dried granules and coating the dried granules.

37. The method of claim 36, wherein the dried granules are greater than 90% solids.

38. The method of claim 36, wherein the dried granules arm greater than 95% solids.

39. The method of claim 36, wherein the dried granules are greater than 98% solids.

40. The method of claim 36, wherein the dried granules are separated with a screen into an amount of undersized dried granules, oversized dried granules, and dust.

41. The method of claim 40, wherein the undersized dried granules and dust are mixed with an amount of acidic blowdown from an emissions scrubbing apparatus and reintroduced to a pugmill.

42. The method of claim 40, wherein the oversized dried granules are crushed in a mill and mixed with an amount of acid blowdown from an emissions scrubbing apparatus and reintroduced to a pugmill.

43. The method of claim 36, wherein the dried granules are cooled to less than 43° C. in a cooling apparatus.

44. The method of claim 43, wherein the cooling apparatus is a fluidized bed.

45. The method of claim 43, wherein the cooling apparatus is a rotating drum.

46. The method of claim 36, wherein coating the dried granules comprises coating with a chemical material imparting a resistance to abrasion and dust generation.

47. The method of claim 1, wherein the organic sludge is not slurried before being mixed with the ammonium salt.

48. The method of claim 1, wherein no calcium carbonate is used.

49. A method of manufacturing a fertilizer comprising:
dewatering an organic sludge;
mixing and heating the dewatered organic sludge in a pressure vessel with a force sufficient to produce a thixotropic paste, wherein the temperature of the paste is maintained at or above 44° C.;
acidifying the thixotropic paste with a concentrated acid, wherein the acidified paste has a pH of less than 5.5;
blending the acidic paste and a melt of an ammonium salt in one of three pressure vessels such that a first pressure vessel is filling, while a second pressure vessel is pressurizing and reacting, and while a third pressure vessel is emptying, wherein the three pressure vessels are operating concurrently and the temperature is maintained at 85° C. or more and the pressure is maintained at 20 psig or more;
mixing a pH control agent and a hardening agent with the blended acidic paste, wherein the pH is between 5.0 and 7.0;
dewatering the blended acidic paste to form the fertilizer;
forming granules of the fertilizer; and
coating the granules with a chemical material to resist abrasion and dust generation.

50. The method of claim 49, wherein the dewatering of the organic sludge results in a solids content of 20-25%.

* * * * *